(12) United States Patent
Kim et al.

(10) Patent No.: US 10,425,155 B2
(45) Date of Patent: Sep. 24, 2019

(54) DEVICE AND METHOD FOR FREE SPACE COHERENT OPTICAL COMMUNICATION BY MEANS OF AUTOMATIC COMPENSATION FOR PHASE NOISE IN ATMOSPHERE USING FEMTOSECOND LASER OPTICAL COMB

(71) Applicant: Korea Advanced Institute of Science and Technology, Daejeon (KR)

(72) Inventors: Seung-Woo Kim, Daejeon (KR); Young-Jin Kim, Daejeon (KR); Byung Jae Chun, Daegu (KR); Hyun Jay Kang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/744,948

(22) PCT Filed: Aug. 21, 2015

(86) PCT No.: PCT/KR2015/008760
§ 371 (c)(1),
(2) Date: Jan. 15, 2018

(87) PCT Pub. No.: WO2017/010605
PCT Pub. Date: Jan. 19, 2017

(65) Prior Publication Data
US 2018/0212676 A1    Jul. 26, 2018

(30) Foreign Application Priority Data

Jul. 15, 2015   (KR) .................. 10-2015-0100208

(51) Int. Cl.
*H04B 10/071* (2013.01)
*H04B 10/11* (2013.01)
(Continued)

(52) U.S. Cl.
CPC .......... *H04B 10/071* (2013.01); *G01S 17/325* (2013.01); *G01S 17/87* (2013.01);
(Continued)

(58) Field of Classification Search
None
See application file for complete search history.

(56) References Cited

U.S. PATENT DOCUMENTS

| 6,661,973 B1 | 12/2003 | Huber et al. |
| 7,266,257 B1 * | 9/2007 | Chowdhury ....... H04B 10/1121 385/1 |

(Continued)

FOREIGN PATENT DOCUMENTS

| JP | 2003124883 A | 4/2003 |
| JP | 2007526717 A | 9/2007 |

OTHER PUBLICATIONS

Dai et al., "Generation of high repetition rate femtosecond pulses from a CW laser by a time-lens loop", Apr. 13, 2009, Optics Ecpress, vol. 17, No. 8, pp. 6584-6590 (Year: 2009).*

*Primary Examiner* — David W Lambert
(74) *Attorney, Agent, or Firm* — The Webb Law Firm

(57) ABSTRACT

Provided are a device and method for free space coherent optical communications by means of an automatic compensation for phase noise in atmosphere using a femtosecond laser optical comb, and more particularly, a device and method for free space coherent optical communications by means of an automatic compensation for phase noise in atmosphere using a femtosecond laser optical comb, in which a phase shift value due to atmospheric turbulence is obtained from reflected light of transmission light generated from a femtosecond laser optical comb and the transmission light is pre-distorted on the basis of the phase shift value, (Continued)

thereby pre-compensating, in a transmission end, for phase noise due to atmospheric turbulence.

8 Claims, 6 Drawing Sheets

(51) Int. Cl.
    *H04B 10/58*     (2013.01)
    *H04B 10/50*     (2013.01)
    *H04B 10/516*     (2013.01)
    *G01S 17/32*     (2006.01)
    *G01S 17/87*     (2006.01)
    *G01S 17/95*     (2006.01)

(52) U.S. Cl.
    CPC .............. *G01S 17/95* (2013.01); *H04B 10/11* (2013.01); *H04B 10/50577* (2013.01); *H04B 10/516* (2013.01); *H04B 10/58* (2013.01)

(56) References Cited

U.S. PATENT DOCUMENTS

| | | | |
|---:|---|---|---|
| 9,304,313 B1* | 4/2016 | Barchers | H04B 10/00 |
| 2003/0034432 A1 | 2/2003 | Presby et al. | |
| 2004/0141752 A1 | 7/2004 | Shelton et al. | |
| 2005/0196170 A1* | 9/2005 | Winsor | H04B 10/1121 |
| | | | 398/118 |
| 2009/0220246 A1 | 9/2009 | Khurgin et al. | |
| 2015/0139654 A1* | 5/2015 | Mandelbaum | H04B 10/2507 |
| | | | 398/83 |

\* cited by examiner

# DEVICE AND METHOD FOR FREE SPACE COHERENT OPTICAL COMMUNICATION BY MEANS OF AUTOMATIC COMPENSATION FOR PHASE NOISE IN ATMOSPHERE USING FEMTOSECOND LASER OPTICAL COMB

CROSS-REFERENCE TO RELATED APPLICATIONS

This application is the United States national phase of International Application No. PCT/KR2015/008760 filed Aug. 21, 2015, and claims priority to Korean Patent Application No. 10-2015-0100208 filed Jul. 15, 2015, the disclosures of which are hereby incorporated in their entirety by reference.

TECHNICAL FIELD

The present invention relates to a device and method for free space coherent optical communications by means of an automatic compensation for phase noise in atmosphere using a femtosecond laser optical comb, and more particularly, to a device and method for free space coherent optical communications by means of an automatic compensation for phase noise in atmosphere using a femtosecond laser optical comb, in which a phase shift value due to atmospheric turbulence is obtained from reflected light of transmission light generated from a femtosecond laser optical comb and the transmission light is pre-distorted on the basis of the phase shift value, thereby pre-compensating, in a transmission end, for phase noise due to atmospheric turbulence.

BACKGROUND ART

The present invention relates to a method for compensating for atmospheric turbulence to improve accuracy in a system for free space coherent optical communications and relates to an equalization technique for a femtosecond laser optical combs.

In the case of free space optical communications, if an atmosphere refractive index on an optical path length is changed when laser light is propagated, a phase that the laser light experiences is changed, and the phase changed over time may be observed as a change of a frequency. That is, $$f = \frac{d\phi}{dt} \quad (f: \text{optical frequency}, \phi: \text{optical phase})$$

The atmosphere reflective index is changed by a change of pressure, a change of temperature, a change of humidity, a change of wind and atmosphere composition, and the like, and continues to be changed over time in an actual outside atmosphere environment. Accordingly, the optical path length of the laser light transmitted by a transmitter in the system for free space coherent optical communications is changed, and finally, a phase of light received by a receiver is changed. Such a phase variation continues to be changed over time, and it is represented by a shift and fluctuation of an optical frequency. Further, a mechanical motion of the transmitter and the receiver may cause the Doppler shift in the optical frequency, and this Doppler shift is finally represented by a shift of the optical frequency received by the receiver. Since the phase change of the received light due to such atmospheric turbulence and Doppler shift increases bit error and causes inter symbol interference (ISI) of transmitted symbols in a process of demodulating signals after receiving data in the optical communications, a technology of accurately measuring an influence due to the atmospheric turbulence and Doppler shift and automatically compensating the measured influence is required to implement free space coherent optical communications.

In order to compensate for the phase change of the optical frequency caused due to the atmospheric turbulence, a carrier recovery technology of locking a phase and a frequency of a local oscillator used to demodulate the data to the transmitted light including the data to compensate for the influence of the atmospheric turbulence was conventionally used, but since such a method requires the same number of local oscillators and phase locked loops for each of optical frequencies used as an optical source for optical communications, it is difficult to apply to a system using several optical frequencies as frequencies for data transmission such as a wavelength division multiplexing (WDM) system because the system becomes complex and is expensive.

Therefore, in the system for free space coherent optical communications, a method of compensating for the change of the phase and frequency of the light caused by the atmospheric turbulence and alleviating complexity is required, and particularly, it is required that the complexity is not increased even in the system using the several optical frequencies as the frequencies for data transmission such as the wavelength division multiplexing (WDM) system.

DISCLOSURE

Technical Problem

An object of the present invention is to provide a device and method for free space coherent optical communications by means of an automatic compensation for phase noise in atmosphere using a femtosecond laser optical comb that may be transmitted without being influenced by atmospheric turbulence, by measuring a shift and fluctuation of the atmospheric turbulence on optical frequency using reflected light that transmitted light is reflected from a receiving unit and pre-distorting the transmitted light based on the measured shift and fluctuation of the optical frequency.

Other objects of the present invention may be easily understood by a description of exemplary embodiments described below.

Technical Solution

In one general aspect, a device for free space coherent optical communications by means of an automatic compensation for phase noise in atmosphere using a femtosecond laser optical comb includes a first light source unit outputting first laser light measuring atmospheric turbulence of a free space; a second light source unit outputting second laser light transmitting data; a modulation unit modulating the second laser light with a predetermined modulation method to generate modulated light; a compensation unit which is input with the modulated light and the first laser light and pre-distorts overlapped light obtained by overlapping the modulated light and the first laser light to generate transmitted light; an optical transmission unit transmitting the transmitted light to a receiver through the free space; and an optical reception unit receiving reflected light that the transmitted light is reflected from the receiver and is incident, wherein the compensation unit is further input with the first laser light and the reflected light, measures the atmospheric turbulence of the free space by comparing the reflected light with reference light, and pre-distorts the overlapped light based on the measured atmospheric turbulence.

The compensation unit may include an optical detection part generating a beat frequency by synthesizing a component of the reflected light corresponding to the same optical frequency as the first laser light with the first laser light, and converting the beat frequency into an electrical signal; a measurement part including a frequency oscillator, and measuring the atmospheric turbulence by synthesizing the electrical signal with a radio frequency signal generated from the frequency oscillator using a heterodyning method and passing the synthesized signal through a low pass filter; and a pre-distortion part distorting a phase or a frequency of the overlapped light based on the measured atmospheric turbulence to generate the transmitted light.

The pre-distortion part may include one selected from an electro-optic modulator, an acousto-optic modulator, an interferometer including a diffraction grating, a piezoelectric transducer, and a device modulating the optical frequency and phase.

The frequency oscillator may generate the radio frequency signal depending on a frequency standard.

The first laser source may be cw(continuous-wave) laser obtained by extracting and amplifying one optical frequency mode from the optical comb generated from the femtosecond laser light source having stabilized repetition rate and offset frequency.

The second laser source may be cw(continuous-wave) laser obtained by extracting and amplifying one optical frequency mode from the optical comb generated from the femtosecond laser source having stabilized repetition rate and offset frequency.

The modulation method may be one of modulation methods selected from phase modulation (PM), frequency modulation (FM), phase-shift keying (PSK), frequency-shift keying (FSK), quadrature phase shift keying (QPSK), and quadrature amplitude modulation (QAM).

The second laser source may be configured by overlapping two or more cw(continuous-wave) lasers having different optical frequencies, and the modulation method may be a method of independently modulating each of the CW(continuous-wave) lasers configuring the second laser source with one selected from phase modulation (PM), frequency modulation (FM), phase-shift keying (PSK), frequency-shift keying (FSK), quadrature phase shift keying (QPSK), and quadrature amplitude modulation (QAM)

In another general aspect, a method for free space coherent optical communications by means of an automatic compensation for phase noise in atmosphere using a femtosecond laser optical comb includes a) generating a plurality of cw lasers by extracting and amplifying a plurality of different optical frequencies from a femtosecond laser optical comb stabilized for a frequency standard; b) modulating the remaining cw lasers except for one of the cw lasers for data transmission; c) forming overlapped light by overlapping the modulated light lasers for the data transmission and the light lasers which are not modulated; d) pre-distorting the overlapped light based on predetermined atmospheric turbulence and transmitting it to a receiver from a transmitter through the free space; and e) updating the atmospheric turbulence by receiving, by the transmitter, reflected light generated by the overlapped light which is reflected from the receiver and comparing the reflected light with the cw lasers which are not modulated, wherein the steps b) to e) are repeated until the data transmission is terminated, and the atmospheric turbulence is a change in a frequency and a phase experienced by the cw lasers when the cw lasers pass through the free space.

Advantageous Effects

As set forth above, according to the present invention, it is possible to provide the free space coherent optical communications system which may be transmitted without error by pre-distorting the transmitted light based on the atmospheric turbulence measured from the reflected light of the transmitted light to thereby remove the influence of the atmospheric turbulence.

In particular, it is possible to compensate for both of the shift and fluctuation of the frequency due to the atmospheric turbulence of another adjacent optical frequency experiencing the same optical path, using one optical frequency and a pre-distortion part, unlike the conventional method.

BEST MODE

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention.

Unless indicated otherwise, it is to be understood that all the terms used herein including technical and scientific terms have the same meaning as those that are understood by those skilled in the art.

It should be understood that the terms defined in the dictionary which is generally used are identical with the meanings within the context of the related art, and they should not be ideally or excessively formally construed unless clearly defined otherwise in the present application.

Hereinafter, a transmitter having an atmospheric turbulence compensation function in a system for free space coherent optical communications according to the present invention will be described in detail with reference to the accompanying drawings.

As a result of performing a study for improving degradation of communications quality due to atmospheric turbulence in a system for free space coherent optical communications, the present applicant has found that optical communications that has minimal error and may be transmitted at high speed may be performed by measuring the atmospheric turbulence from reflected light that transmitted light is reflected from a receiving end and pre-distorting the transmitted light according to the measured atmospheric turbulence, and deepens this to thereby complete the present invention.

Figure 1:
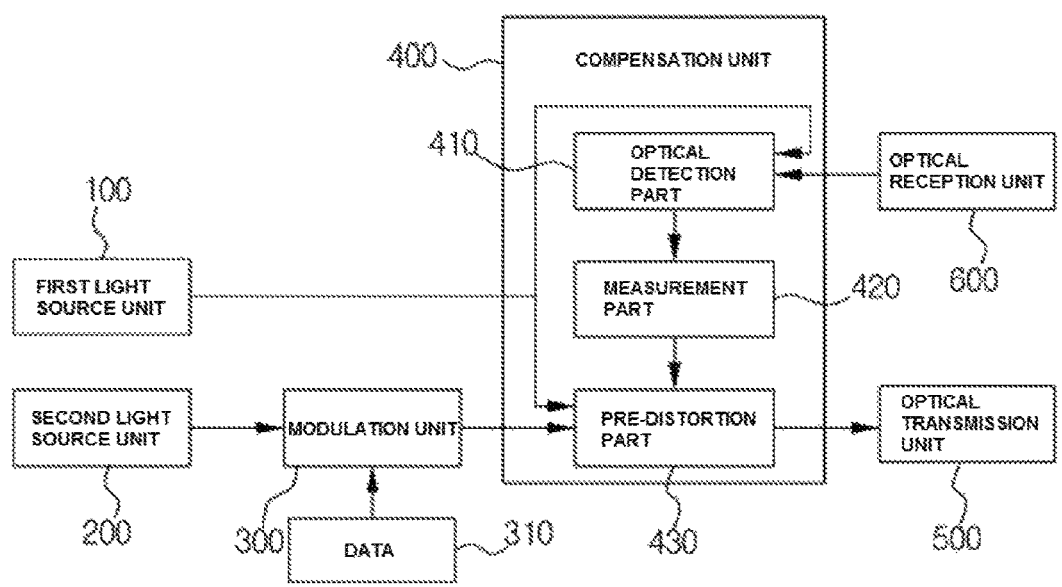
FIG. 1 is a block diagram of a device for free space coherent optical communications by means of an automatic compensation for phase noise in atmosphere using a femtosecond laser optical comb according to an exemplary embodiment of the present invention.

FIG. 1 is a block diagram of a device for free space coherent optical communications by means of an automatic compensation for phase noise in atmosphere using a femtosecond laser optical comb according to an exemplary embodiment of the present invention. Referring to FIG. 1, a transmitter having an atmospheric turbulence compensation function in a device for free space coherent optical communications by means of an automatic compensation for phase noise in atmosphere using a femtosecond laser optical comb according to an exemplary embodiment of the present invention may include a first light source unit 100, a second light source unit 200, a modulation unit 300, a compensation unit 400, an optical transmission unit 500, and an optical reception unit 600.

The first light source unit 100 may output first laser light used to acquire a measured value for an influence of atmospheric turbulence on an optical frequency. The second light source unit 200 may output second laser light which corresponds to a carrier frequency and is used to transmit data for optical communications. The first laser light and the second laser light for measuring a frequency shift and fluctuation amount due to the atmospheric turbulence may be distinguished by different optical frequencies. In addition, the first light source unit 100 and the second light source unit 200 may be devices of extracting an optical frequency mode from an optical comb generated by stabilizing a repetition rate and an offset frequency of the femtosecond lasers to a frequency standard, and amplifying and outputting the extracted optical frequency mode.

The modulation unit 300 is input with the second laser light, and may modulate the second laser light by a predetermined modulation method to generate modulated light according to data to be transmitted. The modulation method may be one selected from modulation methods which may be used in coherent optical communications, such as phase modulation (PM), frequency modulation (FM), phase-shift keying (PSK), frequency-shift keying (FSK), quadrature phase shift keying (QPSK), quadrature amplitude modulation (QAM), and the like As long as the modulation method is the modulation method used in the coherent communications system, it may be selected to implement the modulation unit, and in order to implement the modulation method, one or more of an acousto-optic modulator (AOM), an electro-optic modulator (EOM), and an interferometer may be used. The modulation unit is input with the data to be transmitted, may implement one or more of amplitude, a frequency, and a phase of laser light according to the modulation method through a driving frequency modulation of the AOM, a driving voltage modulation of the EOM, a length modulation of the interferometer, and the like, and may be implemented to control one or more of the above-mentioned modulations.

The compensation unit 400 may be input with modulated light obtained by modulating laser of different wavelength to transmit the data and the first laser source, and may generate transmitted light by pre-distorting overlapped light obtained by overlapping the modulated light and the first laser source. An optical coupler, an optical fiber Bragg grating filter, a thin film filter, a beam splitter, and the like that branch one incident light into two paths or combine two incident lights into one light path may be used to overlap the modulated light and the first laser source with each other. Further, the compensation unit 400 may be further input with reflected light that the transmitted light is reflected from the receiving end and is received at a transmitting end, may measure an influence of the atmospheric turbulence on the optical frequency by measuring a shift and fluctuation of a beat frequency generated by the overlap of the first laser source and the reflected light, and may pre-distort the overlapped light obtained by overlapping the modulated light and the first laser light, based on the obtained measured value.

In addition, the compensation unit 400 may include an optical detection part 410, a measurement part 420, and a pre-distortion part 430.

The optical detection part 410 may generate the beat frequency by interference between the reference laser of the first laser source and the transmitted laser which is reflected from the receiving end, and may convert the beat frequency into an electrical signal. To synthesize the reflected light and the first laser source, the optical coupler or a beam splitter may be used.

The measurement part 420 may include a radio frequency oscillator, may synthesize the electrical signal converted by the optical detection part 410 and a radio frequency signal generated by a frequency oscillator, and may obtain a measured value for an influence of the atmospheric turbulence on the optical frequency by passing the synthesized signal through a low pass filter. A mixer and a lock-in amplifier may be used to synthesize the electrical signal converted by the optical detection part 410 and the signal generated by the frequency oscillator.

The pre-distortion part 430 may generate the transmitted light by changing a phase or a frequency of the overlapped light based on the measured value obtained by the measurement part 420. The pre-distortion part 430 may be implemented to include an electro-optic modulator, an acousto-optic modulator, an interferometer, a piezoelectric transducer, and a device capable of modulating the optical frequency and phase. If a value of the measured value obtained by the measurement part 420 is a function over time, the pre-distortion part 430 may perform a role of a filter which is a reverse function of the above-mentioned function to compensate for the influence of the atmosphere turbulence on the optical frequency, such as frequency fluctuation and shift, and the like. Here, the pre-distortion part 430 may be the electro optic modulator, the acousto-optic modulator, the piezoelectric transducer, and a device controlling them.

The optical transmission unit 500 may transmit the transmitted light generated by the compensation unit to the receiver through the free space, and the optical reception unit 600 may receive light that the transmitted light is reflected from the receiver and is incident. Since the reflected light experiences the free space two times, the measured value for the influence of the atmospheric turbulence on the optical frequency measured by the reflected light may correspond to twice a value which needs to be considered when the compensation unit actually performs the pre-distortion, but since the transmitted light is transmitted in a state in which it is pre-distorted in advance, the optical frequency mode corresponding to the first laser source in the reflected light may correspond to those experiencing the atmospheric turbulence once.

For convenience of understanding, propagation of paths of the first laser source and the second laser source will be described as follows.

The first laser source is used as a channel for measuring the influence of the atmospheric turbulence on the optical frequency, and is output from the first light source unit 100 and is then branched into two paths through the optical coupler. The optical signal of a first path propagates to the free space through the optical transmission unit 500 via the compensation unit 400 and arrives at the receiver. The transmitted optical signal of the first path is reflected from the receiver, is again received at the optical reception unit 600 as the reflected light through the free space, and is then input to the optical detection part 410. Here, an optical signal of a second path of the first laser light and the optical signal of the first path of the reflected light which are branched by the optical coupler are interfered by the optical detection part 410 and are converted into the electrical signal by an optical detector, and the converted electrical signal may be an electrical signal having information obtained by measuring the atmospheric turbulence.

The second laser source is used as a channel for transmitting data, and propagates to the free space through the optical transmission unit 500 via the modulation unit 300 and the compensation unit 400 and is received at the receiver.

Figure 2:
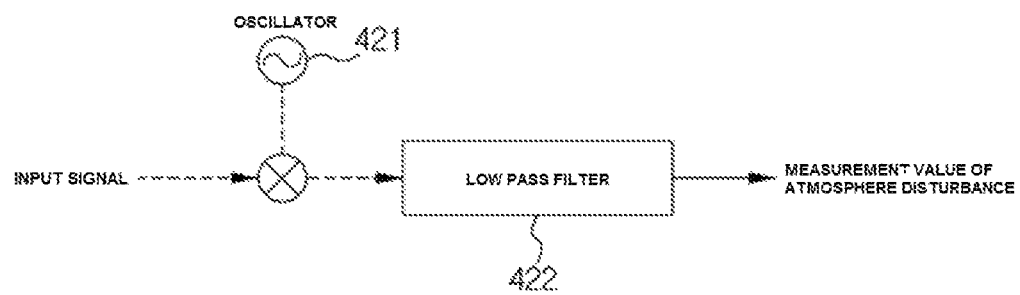
FIG. 2 is a diagram illustrating a measurement part of the device for free space coherent optical communications by means of an automatic compensation for phase noise in atmosphere using a femtosecond laser optical comb according to an exemplary embodiment of the present invention.

FIG. 2 is a diagram illustrating a measurement part of the device for free space coherent optical communications by means of an automatic compensation for phase noise in atmosphere using a femtosecond laser optical comb according to an exemplary embodiment of the present invention. Referring to FIG. 2, the measurement part 420 may include a frequency oscillator 421, a mixer, and a low pass filter 422.

The frequency oscillator 421 may generate a radio frequency signal depending on a frequency standard. The electrical signal (input signal) input from the optical detection part 410 and the radio frequency signal generated by the oscillator are synthesized by the mixer and pass through the low pass filter 422, thereby making it possible to obtain a measurement value (atmospheric turbulence measurement value) for the influence of the atmospheric turbulence on the optical frequency. In this case, since the atmospheric turbulence carried in the optical frequency may not be directly measured due to a high frequency band of the optical frequency, the atmospheric turbulence carried in the optical frequency may be measured by generating a predetermined amount of frequency difference between light passing through atmosphere and reference light that does not pass through atmosphere, generating an optical beat frequency using two generated light, and applying a heterodyning technique to the generated beat frequency and the radio frequency generated by the frequency oscillator. In this case, a frequency shift and fluctuation amount generated by the atmospheric turbulence may exist in a band of Hz and kHz frequency which is significantly lower than an optical frequency of several hundred THz. Since the first laser source is not modulated to transmit the data, a frequency component which is generated as the beat frequency in the radio frequency region is only one.

Therefore, a device for measuring the beat frequency component using the heterodyning technique may include the frequency oscillator, the mixer, and the low pass filter as illustrated in FIG. 2, and the influence of the atmospheric turbulence on the optical frequency may be simply measured by measuring the beat frequency component.

Figure 3:
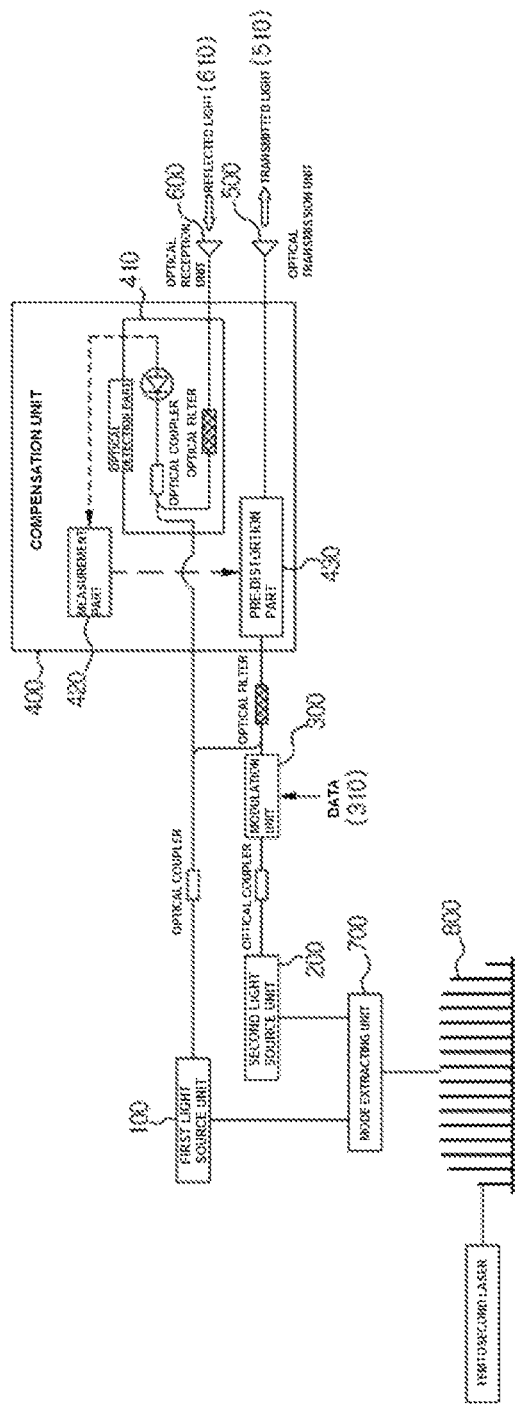
FIG. 3 is an optical configuration diagram illustrating a case of applying cw laser generated by extracting and amplifying one frequency mode from an optical comb generated from femtosecond lasers as a light source in the device for free space coherent optical communications by means of an automatic compensation for phase noise in atmosphere using a femtosecond laser optical comb according to an exemplary embodiment of the present invention.

FIG. 3 is an optical configuration diagram illustrating a case of applying cw laser generated by extracting and amplifying one frequency mode from an optical comb generated from femtosecond lasers as a light source in the device for free space coherent optical communications by means of an automatic compensation for phase noise in atmosphere using a femtosecond laser optical comb according to an exemplary embodiment of the present invention. Referring to FIG. 3, the first light source unit and the second light unit may be implemented by adding a femtosecond laser source 800 and a mode extracting unit 700 which are stabilized for the frequency standard in an optical frequency generating portion. In this case, when a light amount of the two extracted frequency modes is low to several nW, an optical injection locking method may be used as a method for amplifying the low light amount.

The mode extracting unit 700 may extract one or more optical frequency modes having different frequencies from the optical comb generated by femtosecond lasers which are stabilized for the frequency standard, and may be implemented in one or more of a grating, VIPA, an acousto optical variable filter, an interference filter, a variable Fabry-Perot filter, an optical fiber Bragg grating filter, and a thin film filter.

Referring to FIG. 3, since at least two or more cw laser sources are required for the device for free space coherent optical communications by means of an automatic compensation for phase noise in atmosphere using a femtosecond laser optical comb according to an exemplary embodiment of the present invention, it is preferable to extract and use at least two or more optical frequency modes as the first laser light source and the second laser light source from the femtosecond laser light source 800. The injection locking method may be used to increase the optical power.

That is, after extracting the first optical frequency mode and the second optical frequency mode, first cw laser may be generated by injecting the first optical frequency mode into first slave laser, and second cw laser may be generated by injecting the second optical frequency mode into second slave laser.

The respective extracted optical frequency modes may be injected into slave laser without an optical alignment through a circulator, or may be injected into the slave laser through a complex use of a half wave plate ($\lambda/2$ plate, HWP), a quarter wave plate ($\lambda/4$ plate, QWP), and a polarization beam splitter (PBS). Master laser used in the injection locking method may be the first optical frequency mode and the second optical frequency mode extracted from the femtosecond laser optical comb which is stabilized for the frequency standard, and slave laser may be an external free-running oscillator. As the slave laser, all of solid, liquid, and gas lasers may be used, but diode laser may be mainly used.

Figure 4:
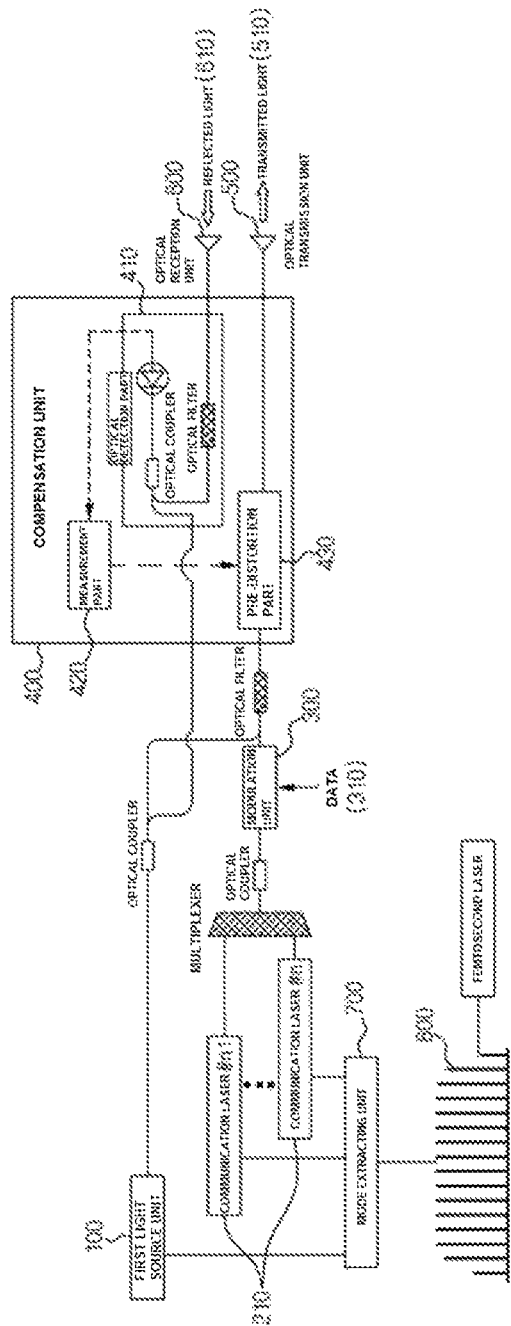
FIG. 4 is an optical configuration diagram illustrating a case in which several cw lasers having different optical frequencies generated from femtosecond lasers using the device for free space coherent optical communications by means of an automatic compensation for phase noise in atmosphere using a femtosecond laser optical comb according to an exemplary embodiment of the present invention are applied to a communications method using wavelength division multiplexing (WDM).

FIG. 4 is an optical configuration diagram illustrating a case in which several cw lasers having different optical frequencies generated from femtosecond lasers using the device for free space coherent optical communications by means of an automatic compensation for phase noise in atmosphere using a femtosecond laser optical comb according to an exemplary embodiment of the present invention are applied to a communications method using wavelength division multiplexing (WDM). The wavelength division multiplexing (WDM) is a method of overlapping cw lasers having different optical frequencies with one transmission path such as an optical fiber and transmitting the overlapped cw laser, and is a method which is currently and widely used because the data may be transmitted by performing an independent modulation for the cw lasers having the respective different optical frequencies and transmission capacity may be increased. Here, in order to increase data transmission capacity and transmission efficiency, an interval between carrier frequencies used to transmit the data needs to be narrow, and in order to reduce interference and error between the carrier frequencies, frequency stability and accuracy of the carrier frequency need to be increased. The femtosecond laser optical comb may be directly stabilized for the frequency standard and obtain high frequency stability and accuracy, and any optical frequency among a wide frequency spectrums that the femtosecond laser optical comb has may be all used.

When the femtosecond laser optical comb is used, the cw lasers having several different optical frequencies may be generated through the injection locking method from any optical frequency mode of the optical comb, and the generated cw lasers have the same frequency characteristics as the femtosecond laser optical comb stabilized for the frequency standard. One of the generated cw lasers may be used to measure and compensate for the influence of the atmospheric turbulence on the optical frequency, and other cw lasers may be used as the carrier frequencies in an optical communications system based on wavelength division multiplexing. That is, the optical frequency modes extracted from the femtosecond laser light source 800 may be used as n communications lasers 210 (collectively referred to as communications laser #1 to communications laser #n), and each of the n communications lasers may correspond to the carrier frequency in the same way as the second light source unit described above, and may be used to transmit optical communications data.

FIG. 4 is an optical configuration diagram illustrating a case in which several cw lasers having different optical frequencies generated from femtosecond lasers using the device for free space coherent optical communications by means of an automatic compensation for phase noise in atmosphere using a femtosecond laser optical comb according to an exemplary embodiment of the present invention are applied to a communications method using wavelength division multiplexing (WDM).

Referring to FIG. 4, the communications method using wavelength division multiplexing (WDM) to which several cw lasers having different optical frequencies generated from femtosecond lasers using the device for free space coherent optical communications by means of an automatic compensation for phase noise in atmosphere using a femtosecond laser optical comb according to an exemplary embodiment of the present invention are applied may include the following steps. The communications method includes a) generating a plurality of cw lasers by extracting a plurality of optical frequencies from a femtosecond laser optical comb stabilized for a frequency standard; b) performing a modulation for one or more of amplitude, a phase, and a frequency for data transmission for the remaining cw lasers except for one of the cw lasers; c) forming overlapped light by overlapping the modulated cw lasers and the cw lasers which are not modulated; d) pre-distorting the overlapped light based on a measurement value for an influence of set atmospheric turbulence on the optical frequency and transmitting it to a receiver; and e) measuring the atmospheric turbulence and updating a pre-distorting amount by receiving reflected light of the cw lasers which are not modulated for data transmission of the transmitted overlapped light and comparing the received reflected light with reference light generated from the cw laser of the same optical frequency, and the steps b) to e) may be repeated until the data transmission to be transmitted is terminated.

Figure 5:
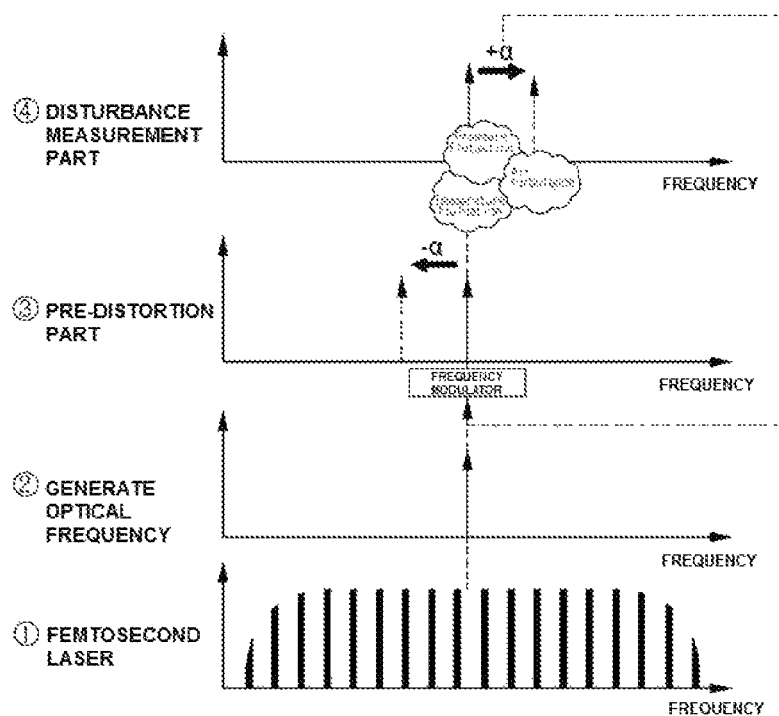
FIG. 5 is a concept diagram illustrating a process of measuring and compensating for atmospheric turbulence in the device for free space coherent optical communications by means of an automatic compensation for phase noise in atmosphere using a femtosecond laser optical comb according to an exemplary embodiment of the present invention.

FIG. 5 is a concept diagram illustrating a process of measuring and compensating for atmospheric turbulence in the device for free space coherent optical communications by means of an automatic compensation for phase noise in atmosphere using a femtosecond laser optical comb according to an exemplary embodiment of the present invention. Referring to FIG. 5, the cw lasers extracted and amplified by the femtosecond laser optical comb stabilized for the frequency standard experience a frequency shift amount ($-\alpha$) based on the measurement value for the influence of the atmospheric turbulence on the optical frequency in the operation of transmitting the optical frequency by one or more frequency modulation devices such as an electro optic modulator (EOM), an acousto optic modulator (AOM), a grating, and the like while passing through the pre-distortion part. Thereafter, the cw lasers experience a frequency shift and fluctuation ($+\alpha$) due to the atmospheric turbulence while passing through atmosphere, and the measurement value continues to compensate for the influence of the atmospheric turbulence on the optical frequency by updating a frequency modulation amount of the frequency modulation device of the pre-distortion part.

Figure 6:
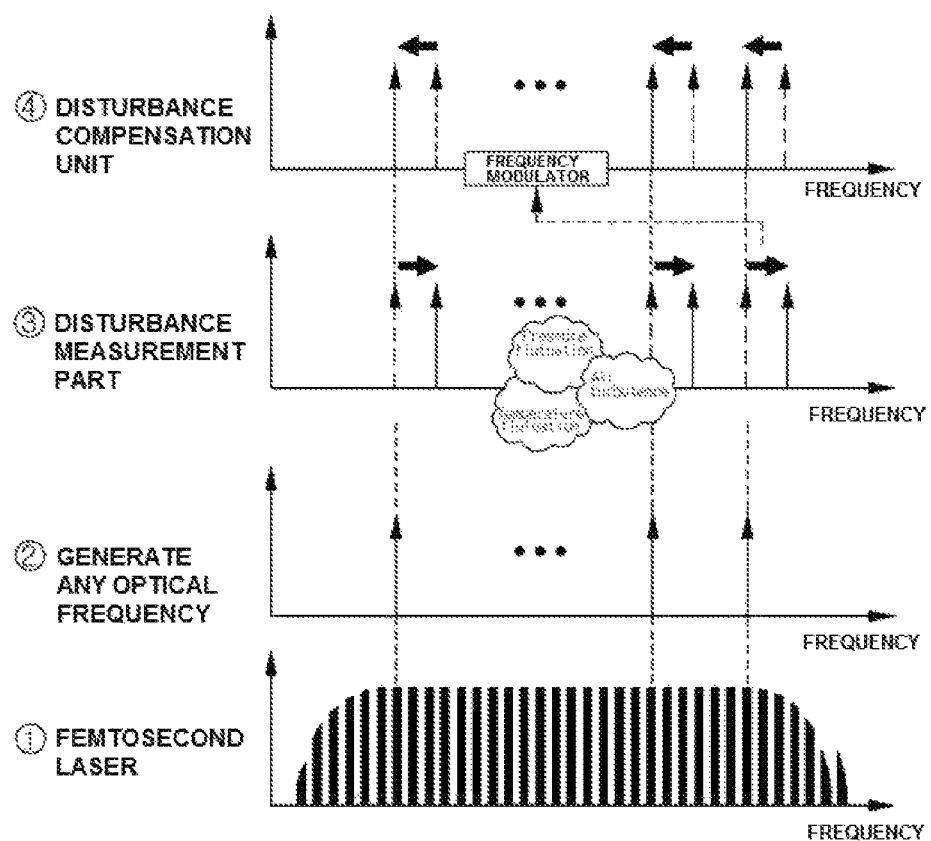
FIG. 6 is a concept diagram illustrating a process of measuring and compensating for atmospheric turbulence in a case in which optical communications are performed using several cw lasers generated based on a femtosecond laser optical combs in the device for free space coherent optical communications by means of an automatic compensation for phase noise in atmosphere using a femtosecond laser optical comb according to an exemplary embodiment of the present invention.

FIG. 6 is a concept diagram illustrating a process of measuring and compensating for atmospheric turbulence in a case in which optical communications are performed using several cw lasers generated based on a femtosecond laser optical combs in the device for free space coherent optical communications by means of an automatic compensation for phase noise in atmosphere using a femtosecond laser optical comb according to an exemplary embodiment of the present invention. In a case in which the system for optical communications is configured using the cw lasers having several different optical frequencies, the frequency shift and fluctuation due to the atmospheric turbulence occur all of the cw lasers experiencing the same transmission path in the same way, and the frequency shift and fluctuation are measured and compensated using any one cw laser which does not perform the modulation for data transmission among the generated cw lasers. Since the influence of the measured atmospheric turbulence on the optical frequency acts on the lasers transmitted on the same path in the same way, it is also possible to compensate for the influence due to the atmospheric turbulence of one cw laser and cw lasers having surrounding different optical frequencies through a system for compensating for atmospheric turbulence.

The system for free space coherent optical communications with atmospheric turbulence compensation according to an exemplary embodiment of the present invention may measure and compensate for phase/frequency disturbance which may occur by the atmospheric turbulence when the optical frequency generated by the laser or the like passes through a transmission medium such as the optical fiber and atmosphere, and may compensate all phase/frequency disturbances due to the atmospheric turbulence of the surrounding different optical frequencies propagating on a common path using a single optical frequency.

This may be applied to various applications such as a frequency transfer, clock synchronization and dissemination, optical communications, and the like.

In particular, as compared to the conventional system, the system for free space coherent optical communications with atmospheric turbulence compensation according to an exemplary embodiment of the present invention may measure the influence of the atmospheric turbulence on the optical frequency using one optical frequency, may compensate for all of the frequency fluctuation and shift due to the atmospheric turbulence of other optical frequencies distributed in a similar frequency region and propagating on the common path, and may be applied regardless of the transmission medium such as the optical fiber and atmosphere and be widely used.

The present invention is not limited to the above-mentioned exemplary embodiments but may be variously applied, and may be variously modified by those skilled in the art to which the present invention pertains without departing from the gist of the present invention claimed in the claims.

Detailed Description of Main Elements
100: first light source unit
200: second light source unit
210: n communications lasers
300: modulation unit
310: data
400: compensation unit
410: optical detection part
420: measurement part
421: oscillator (frequency oscillator)
422: low pass filter
423: input signal
430: pre-distortion part
500: optical transmission unit
510: transmitted light
600: optical reception unit
610: received light
700: mode extracting unit
800: femtosecond laser light source

The invention claimed is:

1. A device for free space coherent optical communications by means of an automatic compensation for phase noise in atmosphere using a femtosecond laser optical comb, the device comprising:
a first light source unit outputting first laser light measuring atmospheric turbulence of a free space;
a second light source unit outputting second laser light transmitting data;
a modulation unit modulating the second laser light in a predetermined modulation method to generate modulated light;
a compensation unit which is input with the modulated light and the first laser light and pre-distorts combined light to generate transmitted light;
an optical transmission unit transmitting the transmitted light to a receiver through the free space; and
an optical reception unit for receiving reflected light of the transmitted light reflected by the receiver,
wherein the atmospheric turbulence of the free space is measured by comparing, by the compensation unit, the reflected light which is further input to the compensation unit with the first laser light.

2. The device of claim 1, wherein the compensation unit includes:
an optical detection part generating a beat frequency by synthesizing a component of the reflected light corresponding to a same optical frequency as the first laser light with the first laser light, and converting the beat frequency into an electrical signal;
a measurement part including a frequency oscillator, and measuring the atmospheric turbulence by synthesizing the electrical signal with a radio frequency signal generated from the frequency oscillator using a heterodyning method and passing the synthesized signal through a low pass filter; and
a pre-distortion part distorting a phase or a frequency of the combined light based on the measured atmospheric turbulence to generate the transmitted light.

3. The device of claim 2, wherein the pre-distortion part includes one selected from an electro-optic modulator, an acousto-optic modulator, an interferometer including a grating, a piezoelectric transducer, and a device modulating an optical frequency and phase.

4. The device of claim 2, wherein the frequency oscillator generates the radio frequency signal depending on a frequency standard.

5. The device of claim 1, wherein at least one of the first laser light and the second laser light is cw laser light obtained by extracting and amplifying one optical frequency mode from a optical comb generated from a femtosecond laser light source having stabilized repetition rate and offset frequency.

6. The device of claim 1, wherein the modulation method is one of modulation methods selected from phase modulation (PM), frequency modulation (FM), phase-shift keying (PSK), frequency-shift keying (FSK), quadrature phase shift keying (QPSK), and quadrature amplitude modulation (QAM).

7. The device of claim 1, wherein the second laser light is configured by combining two or more cw lasers having different optical frequencies, and
the modulation method is a method of independently modulating each of the cw lasers with a modulation method selected from phase modulation (PM), frequency modulation (FM), phase-shift keying (PSK), frequency-shift keying (FSK), quadrature phase shift keying (QPSK), and quadrature amplitude modulation (QAM).

8. A method for free space coherent optical communications by means of an automatic compensation for phase noise in atmosphere using a femtosecond laser optical comb, the method comprising:
a) generating a plurality of cw laser by extracting and amplifying a plurality of different optical frequencies from a femtosecond laser optical comb stabilized for a frequency standard;
b) selecting a cw laser light for a phase noise compensation and modulating remaining cw laser lights for data transmission;
c) combining the selected cw laser light with the remaining cw laser lights that are modulated for data transmission;
d) pre-distorting the combined light based on predetermined atmospheric turbulence and transmitting it to a receiver from a transmitter through the free space; and e) measuring and updating the atmospheric turbulence by receiving, by the transmitter, reflected light generated by the combined light which is reflected from the receiver and comparing the reflected light with the selected cw laser light which is for a phase noise compensation, wherein steps b) to e) are repeated until the data transmission is terminated, and the atmospheric turbulence is a change in a frequency and a phase experienced by the cw laser light when the cw laser light pass through the free space.

* * * * *